(12) United States Patent
Gabrielsen

(10) Patent No.: US 11,961,641 B2
(45) Date of Patent: Apr. 16, 2024

(54) DEEP SEA HEAVY LIFTING SYNTHETIC CABLE

(71) Applicant: NEXANS, Courbevoie (FR)

(72) Inventor: Andreas Gabrielsen, Nittedal (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/239,146

(22) Filed: Apr. 23, 2021

(65) Prior Publication Data

US 2021/0343450 A1 Nov. 4, 2021

(30) Foreign Application Priority Data

Apr. 30, 2020 (EP) .................................. 20 305 420

(51) Int. Cl.
| | | |
|---|---|---|
| *H01B 9/00* | (2006.01) | |
| *H01B 1/02* | (2006.01) | |
| *H01B 7/14* | (2006.01) | |
| *H01B 7/18* | (2006.01) | |

(52) U.S. Cl.
CPC ............... *H01B 7/14* (2013.01); *H01B 1/026* (2013.01); *H01B 7/182* (2013.01); *H01B 7/1895* (2013.01); *H01B 9/00* (2013.01)

(58) Field of Classification Search
CPC ....... H01B 9/005; H01B 11/22; G02B 6/3817
See application file for complete search history.

(56) References Cited

U.S. PATENT DOCUMENTS

| | | | | |
|---|---|---|---|---|
| 2,873,307 | A | | 2/1959 | Horn |
| 3,634,607 | A * | 1/1972 | Coleman | ................... H01B 7/14 174/120 R |
| 4,197,423 | A * | 4/1980 | Fusen | ...................... H01B 7/14 174/107 |
| 4,250,351 | A * | 2/1981 | Bridges | ..................... H01B 7/04 174/106 R |
| 4,317,000 | A * | 2/1982 | Ferer | ...................... H01B 7/182 138/130 |
| 4,725,121 | A | | 2/1988 | Priaroggia |
| 4,830,459 | A * | 5/1989 | Chicken | ............... G02B 6/4403 385/109 |
| 5,113,039 | A * | 5/1992 | Guipe | .................. H01B 7/0009 156/247 |
| 6,463,198 | B1 | 10/2002 | Coleman et al. | |
| 6,714,709 | B1 * | 3/2004 | Birkeland | ............ G02B 6/4427 385/113 |
| 2012/0234596 | A1 * | 9/2012 | Lund | ...................... H01B 7/045 174/70 R |
| 2016/0259143 | A1 | 9/2016 | Vintermyr | |
| 2019/0228876 | A1 | 7/2019 | Consonni et al. | |
| 2021/0071040 | A1 * | 3/2021 | Goubard | ................. C08L 75/06 |
| 2021/0362808 | A1 * | 11/2021 | Jahn | ..................... G01M 5/0025 |

OTHER PUBLICATIONS

International Search Report dated Aug. 7, 2020.
Third Party Observation Pursuant to Article 115 dated Nov. 23, 2022.

* cited by examiner

*Primary Examiner* — Chau N Nguyen

(74) *Attorney, Agent, or Firm* — Sofer & Haroun, LLP

(57) ABSTRACT

A deep sea lifting cable having a cable core (36) surrounded by armouring (32), wherein the armouring is surrounded by an outer jacket (33), wherein the cable core comprises at least one power cable (10) is disclosed. The armouring (32) comprises synthetic stiff ropes and interstices (35) between the stiff ropes are filed with a high viscous filler.

24 Claims, 1 Drawing Sheet

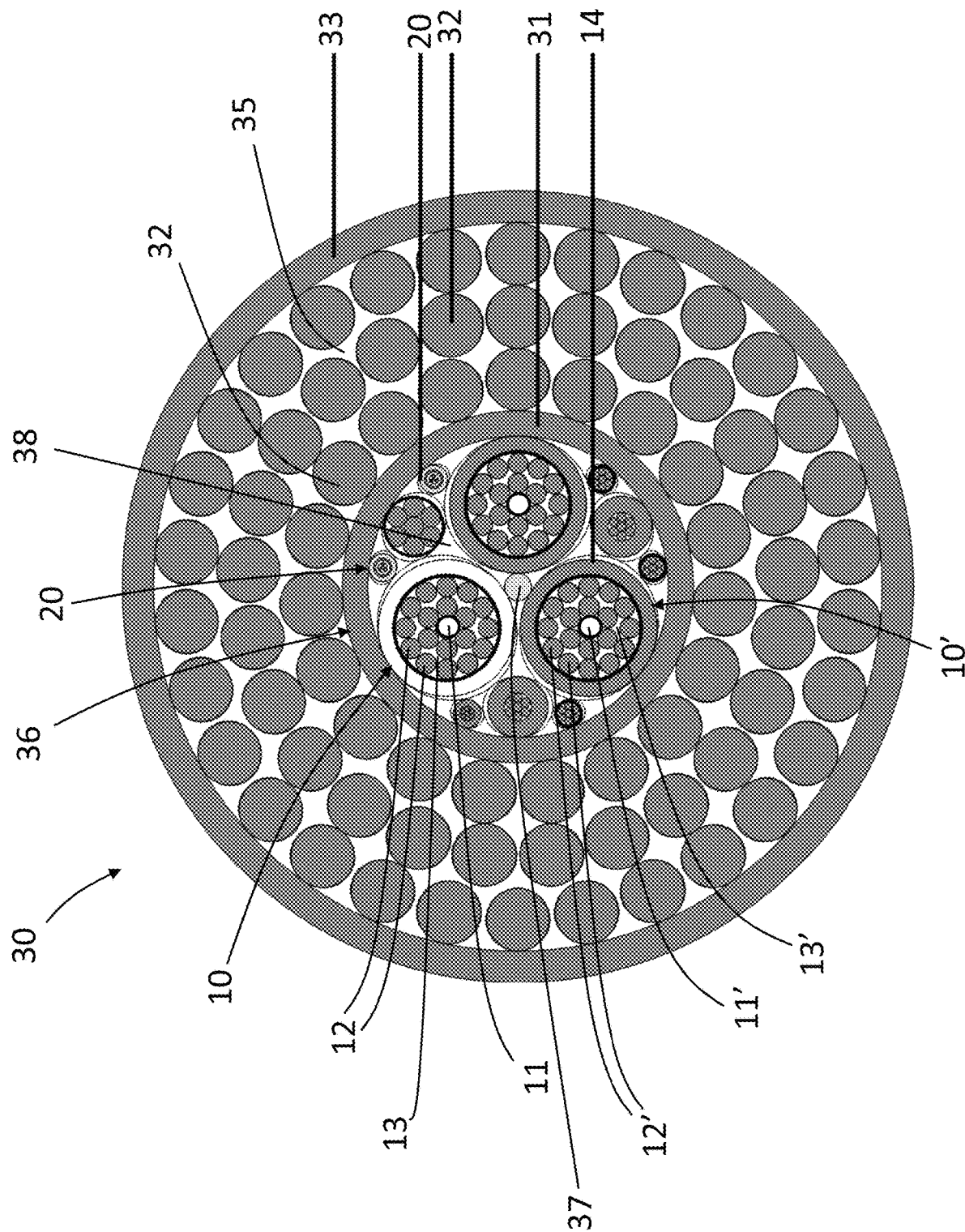

DEEP SEA HEAVY LIFTING SYNTHETIC CABLE

RELATED APPLICATION

This application claims the benefit of priority from European Patent Application No. 20 305 420.0, filed on Apr. 30, 2020, the entirety of which is incorporated by reference.

FIELD OF THE INVENTION

The present invention relates to a deep sea cable, especially a subsea cable with lifting capacity as well as the ability to conduct electrical power and/or electrical and/or optical signals.

BACKGROUND

The mining industry and the oil and gas industry are exploring and extracting resources from deeper and deeper subsea locations. These activities are preformed using instruments, such as remotely operated vehicles (ROV's), exploration tools etc. that are powered, controlled and deployed via cables. The cables may transport power in the form of electricity, fluids such as hydraulic fluid, as well as electric and/or optical signals.

The deep sea location means high pressures at the sea floor and long distances from top side to the sea floor.

PRIOR ART

U.S. Ser. No. 10/170,219 discloses a power umbilical with large electric power cables, stiff polymer filler elements and load carrying bundles. Wherein the load carrying bundles may consist of six carbon fibre rods arranged around strain sensing fibre optical cable. The power umbilical contains strain sensors to monitor the cable.

Synthetic ropes as such are well known. Synthetic ropes can be braided of yarns of synthetic fibres/filaments such as aramid, high-modulus polyethylene (HMPE) or blends or combinations thereof.

Objectives of the Invention

The present invention aims at providing a deep sea cable with electric power transfer and signal transfer functions having improved lifting capacity. The signal transfer may be by electrical or optical signals.

Especially, improved lifting capacity with an equivalent or smaller diameter.

The cable diameter directly influences the size of the handling equipment, limiting the diameter, while maintain or improving the lifting capacity results in large overall savings.

One aim is to increase the elasticity (strain to yield) of the cable core, and increase the axial stiffness of the armouring.

A further aim is to provide a deep sea cable with reduce radial deformation/compaction when used at great sea deeps.

It is further an objective to provide a reelable deep sea cable.

The present invention provides a deep sea cable comprising a cable core surrounded by armouring, wherein the armouring is surrounded by an outer jacket, wherein the cable core comprises at least one power cable, wherein the armouring comprises synthetic stiff ropes and interstices between the stiff ropes are filed with a high viscous filler.

In one aspect each stiff rope is made of yarn comprising filaments that have an axial elastic modulus of above 80 GPa, or above 120 GPa, preferably above 145 GPa or above 160 GPa. In a further aspect said yarn comprises above 80% preferably 100% filaments with an axial elastic modulus of above 80 GPa, or above 120 GPa, preferably above 145 GPa or above 160 GPa. Axial elastic modulus is measured according to ASTM D3379.

In a further aspect of the deep sea cable the stiff ropes are made of synthetic yarn, the yarn is braided to form the rope. The yarn is preferably prepared of filaments of a material selected from HMPE, aramid, or other high modulus yarn materials or a combination thereof.

In a further aspect of the deep sea cable, the high viscous filler has an apparent viscosity of more than 100 Pas at 35° C., preferably the apparent viscosity is more than 500 Pas, more preferably more than 1000 Pas at 35° C. The apparent viscosity can be determined by well known rheological methods, such as according to ASTM D3236.

Further the high viscous filler is preferably temperature stable up to at least 100° C. such that the high viscous filler has an apparent viscosity at 100° C. of more than 100 Pas, preferably more than 200 Pas at 100° C.

In another aspect of the deep sea cable the power cable comprises a conductor, surrounded by a conductor insulation and a central conductor core of a polymer material. The polymer core is softer, less stiff than the metal conductor and improves the elasticity of the power cable and thereby the elasticity of the cable core of the deep sea cable. Preferably the polymer is selected from the group consisting of polypropylene, polyethylene, polyolefin, thermoplastic polyester or rubber or combinations thereof.

In one aspect of the cable the conductor comprises a conductor material selected from copper, copper alloys or combinations thereof. Applicable copper alloys include Cu/CuAg micro-alloys.

In a further aspect the interstices in the power cable comprise the same high viscous filler as the armouring interstices.

In another aspect the power cable has an elasticity measured as strain to yield of at least 0.6%, preferably at least 1.0%.

In a further aspect of the deep sea cable core further comprises at least one optical cable.

In one aspect the deep sea cable will comprise three main power cables each comprising one conductor, forming a three phase power cable. Alternatively, a multitude of three power cables may be included.

In yet another aspect of the deep sea cable the interstices in the cable core between the power cable(s), optional optical cable(s) and optional additional elements comprise the same high viscous filler as the armouring interstices.

In another aspect of the deep sea cable the deep sea cable core has an elasticity measured as strain to yield of at least 0.6%, preferably at least 1.0%.

Utilizing high stiffness rope as armouring combined with the high viscosity filling compound in the interstices, rather than conventional extruded solid filler elements has the effect that the elements of the lifting cable stay in their place during operation on a winch system.

The ropes are preferably made of the premium grades of synthetic yarns available, such as HMPE, aramid etc.

A known problem with conventional ropes is the large initial constructional stretch and relative low axial stiffness, due to radial displacements and bedding in. The high viscous filler offers a solution to at least part of this problem.

In one embodiment, efforts could be made throughout manufacturing of both rope, and cable to preserve as much as possible of the material stiffness. The high stiffness ropes may be pre-conditioned by tension cycles to remove constructional stretch (bedding in).

The use of a high viscous filling compound in conjunction with high stiffness ropes provides an advantages combination. The filling compound minimizes the huge problem of radial deformation/compaction of cables and ropes with synthetic armouring, and at the same time does not prevent the relative movement of individual ropes during bending at high tension. The filling compound acts as a pressure compensator and redistributes the radial forces which gives less friction forces.

The structure of the one or more power cables included in the deep sea cable may be selected to increase the elasticity of the power cables. An advantages design includes a central soft polymer rod surrounded by the conductor and further surrounded by conductor insulation.

In conventional subsea cables the Cu conductors define the maximum working tension of subsea cables as Cu has the lowest strain to yield of the materials used. By making a special conductor with soft core this property of Cu can be circumvented and a much larger strain to yield is achieved.

In an embodiment this power cable design is combined with filling the interstices between the one or more power cables and other cable elements such as optical cables and electrical signal cables in the deep sea cable with a high viscous filler.

Further combined with the armouring of synthetic ropes and an equivalent high viscous filler in the armouring layer, which boosts the axial stiffness (up to 3 times conventional ropes of the same size), this gives an improved solution and smallest diameter for deep sea heavy lifting cable.

The term "insulation" as in "conductor insulation" may refer to a combination of layers insulating the conductor.

The term "deep sea" as used herein refers to sea depths of over 1000 m, more specifically more than 2000 m below the sea surface, such as from 2000 m to 6000 m below the sea surface or from 2000 m to full ocean depth.

The term "lifting" in "lifting cable" refers to the intended use of the cable for lifting subsea equipment, such as a ROV into the sea, and from deep sea up to and near the sea surface.

The term "cable" as used herein should be understood to refer to an element designed to transfer electrical power and/or electrical or optical signals over the distance of the cable.

The subsea equipment, such as deep sea mining equipment is often heavy and may weigh several hundred tons.

When initiating lifting from for instance 6000 m sea depth, the weight to be lifted is the weight of the equipment and the weight of 6000 m deep sea lifting cable. Therefore, limiting the weight of the lifting cable is beneficial.

The high viscous filler may have an apparent viscosity of more than 100 Pas at 35° C., measured by standard rheology methods, especially measured according to ASTM D3236.

Preferably the apparent viscosity is more than 500 Pas, more preferably more than 1000 Pas at 35° C., measured according to ASTM D3236.

Further the high viscous filler is preferably temperature stable up to at least 100° C. meaning that the apparent viscosity at 100° C. is more than 100 Pas, preferably more than 200 Pas at 100° C., measured according to ASTM D3236.

Further the high viscous filler is preferably soft adhesive, meaning that it adheres to the surfaces of the armouring and core elements. The high viscous filler wets the surfaces of the synthetic rope armouring, the insulation and the inner and outer jackets.

The high viscous filler may comprise a solvent, such as waxes, mineral or synthetic oil, polybutenes or bitumen, combined with a blend of polymers, rubbers and additives. Examples of applicable high viscous fillers includes Solarite filling compounds or rubberized bitumen filling compounds (Flooding Compound E) or naphthenic oil with silica additives (Rheogel).

BRIEF DESCRIPTION OF THE DRAWINGS

The enclosed FIG. 1 is a schematic cross-sectional representation of one embodiment of a deep sea lifting cable of the present invention. The Figures are not drawn to scale but illustrates the position of the different elements and the relation therebetween.

The drawing illustrates one possible design of a cable according to the present invention. The number of power cables and signal cables in the cable core as well as arrangement thereof can within the present invention be freely adapted to the needs and requirements for the deep sea cable.

PRINCIPAL DESCRIPTION OF THE INVENTION

The present invention will now be described in further detail with reference to the enclosed FIGURES. FIG. 1 illustrates one embodiment of the present invention illustrating one cable design. Although the invention is described with reference to this design it should be understood that the technical details such as physical properties, material selection and design of the sub-elements such as the power cable is applicable to all deep sea cable designs according to the present invention as defined by the main claim, and not limited to this specific illustrated design.

In one embodiment of the deep sea cable 30 illustrated on FIG. 1 the cable core 36 comprises a number of power and signal conductors. In the illustrated embodiment the core comprises electrical power cables 10, 10', fibre optical cables 20, 20'. The illustrated embodiment comprises additionally electrical signal cables of different size and a further electrical power cable. In this embodiment a central core filler element 37 is included, the core filler element is optionally included to assist the positioning of the three power cables when laying up the cable core 36. A person skilled in the art will appreciate that the structure and design of the cable core can be adopted to the number and size of power and signal cables required.

The electrical power cable 10 comprises a polymer core 11, a conductor 12 surrounding the polymer core 11, and an outer conductor insulation 14. This power cable design provides enhanced elasticity to the power cable. The power cable should preferably have a 0.6-1.0% strain to yield.

The conductor 12 is made of conductor strings wound around the polymer core 11. The conductor comprises Cu and may comprise a Cu/CuAg microalloy.

The polymer core 11 replaces the centre wire of a traditional conductor. The core 11 is a polymer rod. The polymer is selected from soft polymers such as polypropylene, polyethylene, polyolefin, thermoplastic polyester or rubber.

Compared to the metal conductor the polymer core 11 is softer, less stiff and more pliable.

The conductor construction, where the centre is a soft polymer, allows for enhanced elasticity, measured as larger strain to yield performance.

Measuring strain to yield of the power cable or the core of the deep sea cable is measured following normal cable and material testing arrangements. Tension is applied to the specimen in a test bench while monitoring both tension and elongation of the specimen. Elastic behaviour is present up to the yield point where there is a linear correlation between stress and strain.

A person skilled in the art will appreciate that the conductor insulation 14 may comprises layers of different materials with insulating and semi-conducting properties.

The cable core 36 may further comprise one or more optical fibre cables 20. The optical fibre cable 20 can be a traditional subsea fibre cable with a core of fibre optical elements in a protection matrix surrounded by a tubing 22, such as a metal tubing.

The illustrated embodiment on FIGURE includes three power cables 10, two optical cables 20 and seven other smaller electrical cables. The interstices 38 inside the core jacket 31 are filled with an equivalent high viscous filler. A person skilled in the art will appreciate that the number, size and lay up of the elements in the core can be adapted to the specific needs of the deep sea operation.

The elements 10, 10', 20 etc. of the core 36 of the deep sea cable are laid up in a continues helix, or continuously alternating direction in the entire or part of the length of the cable with high lay angles, such as above 18 degrees.

The elasticity (strain to yield) of the cable core 36 is further increased by this design.

The core 36 of the deep sea cable is in one embodiment surrounded by at least two layers of synthetic armouring 32. These armouring layers comprise the high stiffness ropes. The high stiffness ropes have preferably been pre-condition by tension cycles to remove constructional stretch (bedding in).

The pre-conditioned ropes are arranged in the at least two helical layers around the cable core. Interstices between ropes are filled with a high viscosity filling compound, to minimize radial contraction during loading.

The outer jacket 33 surround the outside of the armouring.

EXAMPLE

A deep sea cable according to FIG. 1 was prepared and tested. The deep sea cable comprised three power cables in the core each with a copper conductor with a central conductor core of a polymer material. The armouring consisted of stiff ropes, wherein the yarn filaments have an axial elastic modulus of >80 GPa (ASTM D3379). Interstices of the cable core and the armouring was filed with a high viscous filler with an apparent viscosity of 500 Pas at 35° C. (ASTM D3236).

Cable outer diameter was 60 mm Cable axial stiffness was 52 MN.

Elastic tension limit (lift capacity) of 420 kN.

The cable solution is scalable. By increasing the diameter, the stiffness and lift capacity can be increased.

LIST OF REFERENCE NUMBERS

10 power cable
11 conductor core
12 conductor
13 conductor core interstices
14 conductor insulation
20 optical cable
30 deep sea cable
31 core jacket
32 armouring
33 outer jacket
35 armouring interstices
36 cable core
37 centre element
38 cable core interstices

The invention claimed is:

1. A deep sea cable comprising:
a cable core surrounded by armouring,
wherein the armouring is surrounded by an outer jacket,
wherein the cable core comprises at least one power cable, the cable core having a core jacket, and the core jacket surrounds the power cable, where the power cable comprises a conductor, surrounded by a conductor insulation, said power cable having a central conductor core of a polymer material selected from the group consisting of polypropylene, polyethylene, polyolefin, thermoplastic polyester or rubber, with the central conductor core is less stiff than the conductor,
wherein the armouring comprises synthetic stiff ropes arranged in at least two helical layers around the cable core, and interstices between the stiff ropes of at least two helical layers are filled with a high viscous filler with an apparent viscosity of more than 500 Pas at 35° C., measured according to ASTM D3236,
wherein, within said cable core, interstices in the cable core, inside the core jacket, have the same high viscous filler as the armouring interstices between the core jacket and the outer jacket,
wherein said high viscous filler and said stiff ropes together are sufficient to prevent radial deformation and allowing movement of individual ropes during bending under tension.

2. The deep sea cable according to claim 1, wherein each stiff rope is made of yarn comprising filaments that have an axial elastic modulus of above 80 GPa, measured according to ASTM D3379.

3. The deep sea cable according to claim 2, wherein the yarn comprises above 80% filaments with an axial elastic modulus of above 80 GPa.

4. The deep sea cable according to claim 3, wherein the yarn comprises above 80% filaments with an axial elastic modulus of above 120 GPa.

5. The deep sea cable according to claim 4, wherein the yarn comprises 100% filaments with an axial elastic modulus of above 120 GPa.

6. The deep sea cable according to claim 3, wherein the yarn comprises above 80% filaments with an axial elastic modulus of above 145 GPa.

7. The deep sea cable according to claim 6, wherein the yarn comprises 100% filaments with an axial elastic modulus of above 145 GPa.

8. The deep sea cable according to claim 3, wherein the yarn comprises above 80% filaments with an axial elastic modulus of above 160 GPa.

9. The deep sea cable according to claim 8, wherein the yarn comprises 100% filaments with an axial elastic modulus of above 160 GPa.

10. The deep sea cable according to claim 3, wherein the yarn comprises 100% filaments with an axial elastic modulus of above 80 GPa.

11. The deep sea cable according to claim 2, wherein each stiff rope is made of yarn comprising filaments that have an axial elastic modulus of above 120 GPa, measured according to ASTM D3379.

12. The deep sea cable according to claim 2, wherein each stiff rope is made of yarn comprising filaments that have an axial elastic modulus of above 145 GPa, measured according to ASTM D3379.

13. The deep sea cable according to claim 2, wherein each stiff rope is made of yarn comprising filaments that have an axial elastic modulus of above 160 GPa, measured according to ASTM D3379.

14. The deep sea cable according to claim 1, wherein the stiff ropes are made of synthetic yarn and the yarn is prepared of filaments of a material selected from HMPE, aramid, or other high modulus yarn material or a combination thereof.

15. The deep sea cable according to claim 1, wherein the high viscous filler is temperature stable up to at least 100° C. such that the high viscous filler has an apparent viscosity at 100° C. of more than 100 Pas, measured according to ASTM D3236.

16. The deep sea cable according to claim 15, wherein the high viscous filler is temperature stable up to at least 100° C. such that the high viscous filler has an apparent viscosity at 100° C. of more than 200 Pas, measured according to ASTM D3236.

17. The deep sea cable according to claim 1, wherein the high viscous filler comprises a solvent, selected from the group consisting of waxes, mineral or synthetic oil, polybutenes, and bitumen, combined with a blend of polymers, rubbers and additives.

18. The deep sea cable according to claim 1, wherein the conductor comprises a conductor material selected from copper, copper alloys or combinations thereof.

19. The deep sea cable according to claim 1, wherein the power cable has an elasticity measured as strain to yield of at least 0.6%.

20. The deep sea cable according to claim 19, wherein the power cable has an elasticity measured as strain to yield of at least 1.0%.

21. The deep sea cable according to claim 1, wherein the cable core comprises at least one optical cable and a core jacket surrounding the at least one optical cable.

22. The deep sea cable according to claim 1, wherein the cable core has an elasticity measured as strain to yield of at least 0.6%.

23. The deep sea cable according to claim 22, wherein the cable core has an elasticity measured as strain to yield of at least 1.0%.

24. The deep sea cable according to claim 1, wherein the high viscous filler has an apparent viscosity of more than 1000 Pas at 35° C., measured according to ASTM D3236.

* * * * *